United States Patent [19]
Hamilton

[11] 3,817,342
[45] June 18, 1974

[54] MOTORCYCLE BRAKES
[75] Inventor: Mark H. Hamilton, Hancock, N.H.
[73] Assignee: Rokon, Inc., Keene, N.H.
[22] Filed: May 14, 1973
[21] Appl. No.: 360,383

[52] U.S. Cl. .............................. 180/32, 188/18 A
[51] Int. Cl. ............................................. B60t 1/06
[58] Field of Search .............. 180/32, 33 R, 33 A; 280/264; 188/18 A, 71.1, 73.3

[56] References Cited
UNITED STATES PATENTS

| | | | |
|---|---|---|---|
| 2,917,135 | 12/1959 | Hirzel | 188/71.1 X |
| 3,096,853 | 7/1963 | Farrand | 188/18 A |
| 3,228,493 | 1/1966 | Kershner | 188/73.3 X |
| 3,517,764 | 6/1970 | Wendt | 180/33 R |
| 3,616,870 | 11/1971 | Kramer | 180/32 |

*Primary Examiner*—David Schonberg
*Assistant Examiner*—Terrance L. Siemens

[57] ABSTRACT

A motorcycle including a frame, a rear wheel having an axle, a pair of trailing suspension arms pivotally mounted on the frame for simultaneous pivotal movement about a transverse axis and a pair of resiliently compressible suspension elements extending from the free ends of the suspension arms upward to the frame. There is provided a rear wheel brake assembly comprising a brake disk mounted on the wheel, a brake caliper element assembly and a caliper element assembly arm pivotally mounted on the frame above and spaced from one of the trailing suspension arms and generally parallel thereto, the brake caliper element assembly being mounted on the free end of the caliper element arm extending downwardly therefrom for co-operation with the upper portion of the brake disk. A positioning radius link is pivotally connected to the brake caliper element assembly adjacent the lower end thereof, extending downwardly therefrom and pivotally connected to the axle for positioning the caliper element.

10 Claims, 4 Drawing Figures

MOTORCYCLE BRAKES

This invention relates to motorcycles and more particularly to novel brake systems and engine component frame mountings therefor.

Motorcycles are conventionally provided with a rear wheel suspension system including a pair of pivotally mounted trailing suspension arms having their rear ends supported by resilient suspension elements including springs. With rear brakes whose torque is resolved by feeding it directly into the suspension arms, the force generated by braking action compresses the suspension element springs and so adversely affects the rear wheel suspension and hence the traction of the rear wheel, especially on bumpy surfaces. To remedy this problem, floating systems have been used, usually in the form of a moving parallelogram including the suspension arm, which feeds all the reaction from braking into the motorcycle frame rather than the rear suspension. Such known systems have been defective in a number of respects, however.

Conventional motorcycle engine frame mountings also leave much to be desired, especially from the standpoint of ease of removal of engine and drive components.

Accordingly, it is a major object of the invention to provide a novel motorcycle rear brake system not subject to the deficiencies of heretofore known systems.

It is another object of the invention to provide novel motorcycle engine component frame mountings.

The above and further objects of the invention are provided by a novel motorcycle comprising a frame having a bottom portion, a rear wheel having an axle and preferably a chain sprocket, a power unit preferably having a chain sprocket and mounted in fixed position on the frame bottom portion, and preferably a chain trained around the sprockets for driving the rear wheel. Other rear wheel drives may be used.

In one aspect of the invention, there is provided a pair of trailing suspension arms pivotally mounted on the frame for simultaneous pivotal movement about a horizontal axis, the suspension arms at their trailing ends having adjustable axle mounting means for adjusting said chain if used, and a pair of resiliently compressible suspension elements extending from the free ends of the suspension arms upwardly to the frame. A brake disk is mounted on the wheel and a preferably hydraulic brake caliper element assembly cooperates with the brake disk. A caliper element assembly arm is pivotally mounted on the frame above and spaced from one of the trailing suspension arms and generally parallel thereto, preferably behind one of the suspension elements and a portion of the frame for its protection, the caliper element assembly being mounted on the free end of the caliper element assembly arm extending downwardly therefrom for cooperation with the upper portion of the brake disk. A positioning radius link is pivotally connected to the caliper element adjacent the lower end thereof, extending downwardly therefrom and being pivotally connected to the axle preferably concentrically thereof for positioning the caliper element for rear wheel adjustment.

In another aspect of the invention, there is provided a motorcycle wherein the bottom portion of the frame includes a pair of transversely spaced frame members having a sheet metal plate extending therebetween, the central portion of the plate being formed to provide a pair of longitudinal upwardly extending spaced walls with a horizontal transverse wall extending between the upper ends thereof providing an upwardly extending open bottomed recess between the vertical walls. A plurality of bolts are provided for mounting a power unit on the upper surface of the horizontal transverse wall, said bolts having heads positioned beneath the lower surface of the transverse wall recessed above the lower ends of the upwardly extending walls for protecting the bolt heads while providing access thereto.

In still another aspect of the invention, there is provided a motorcycle having a brake pedal assembly mounted on the lower portion of the frame including a rearwardly extending brake pedal arm pivotally mounted on the lower portion of the frame and having an upwardly extending rigid operating arm, and a rear hydraulic brake piston and cylinder connected to the hydraulic brake caliper element. A plurality of bolts may be provided for mounting the brake cylinder preferably on one of the longitudinal upwardly extending walls, and a generally horizontal connecting link extends rearwardly from said operating arm to said piston. Preferably, there is also provided a vertically extending guard plate mounted adjacent the free end of the brake pedal arm extending upwardly closely adjacent to and beside the lower portion of the frame to prevent side bending of the pedal arm.

For the purpose of fully explaining the above and still further objects and features of the invention, reference is now made to the following detailed description of a preferred embodiment thereof, together with the accompanying drawings, wherein.

Figure 1:
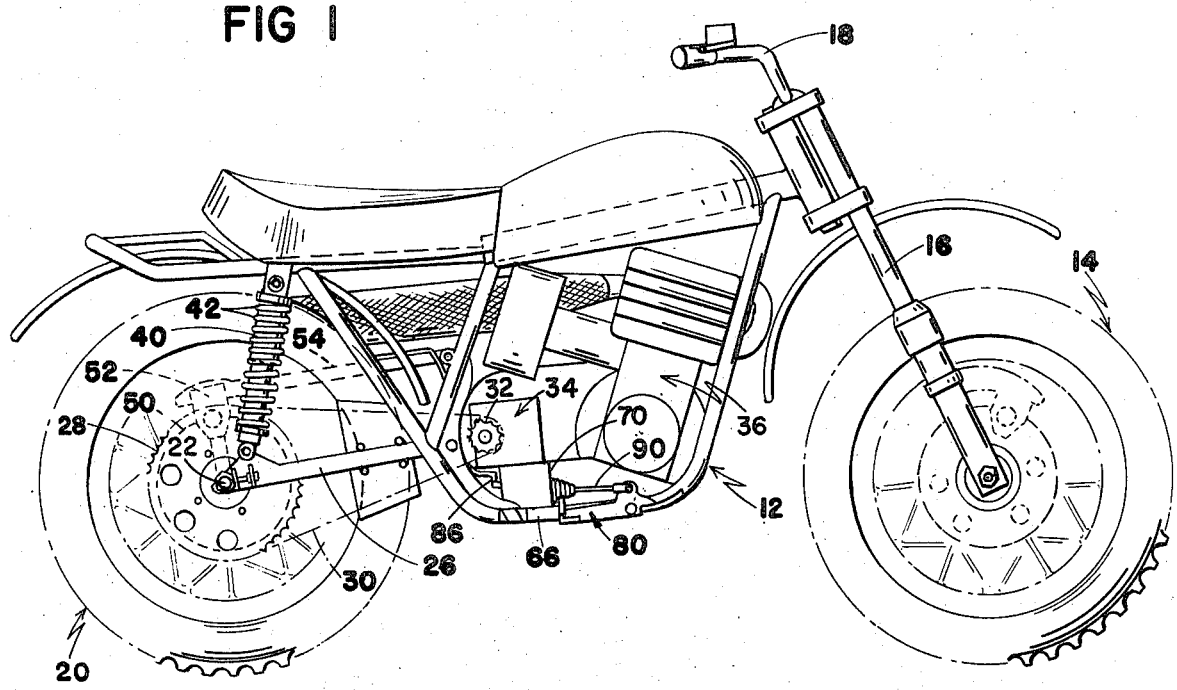
FIG. 1 is a side view of a motorcycle according to the invention.
Figure 2:
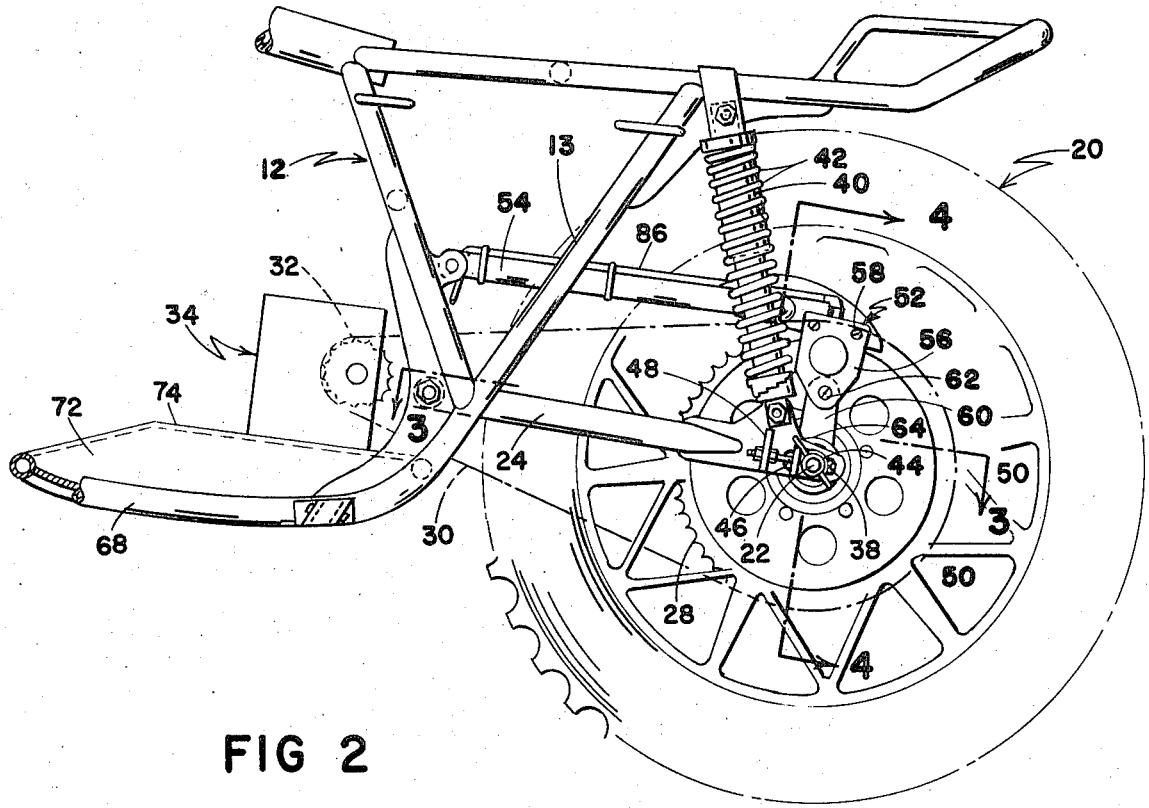
FIG. 2 is an enlarged side view of a portion of the motorcycle of FIG. 1 showing the rear suspension and brake system thereof.
Figure 3:
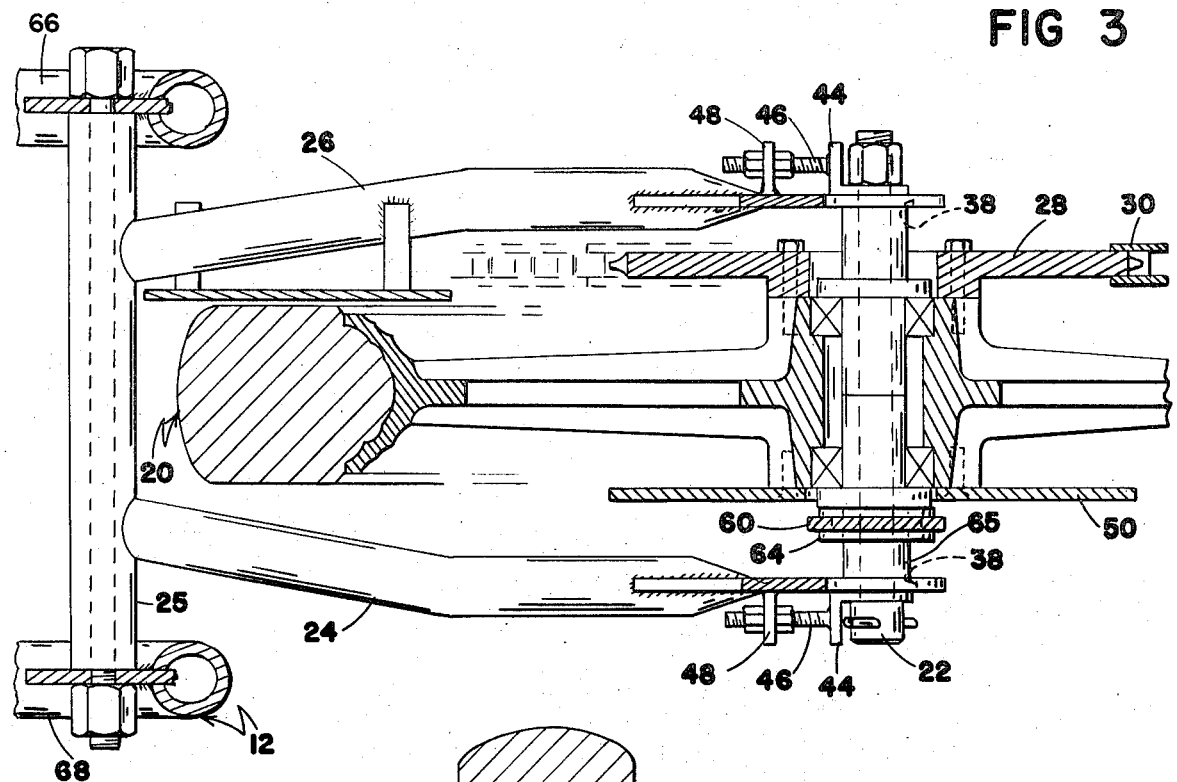
Figure 4:
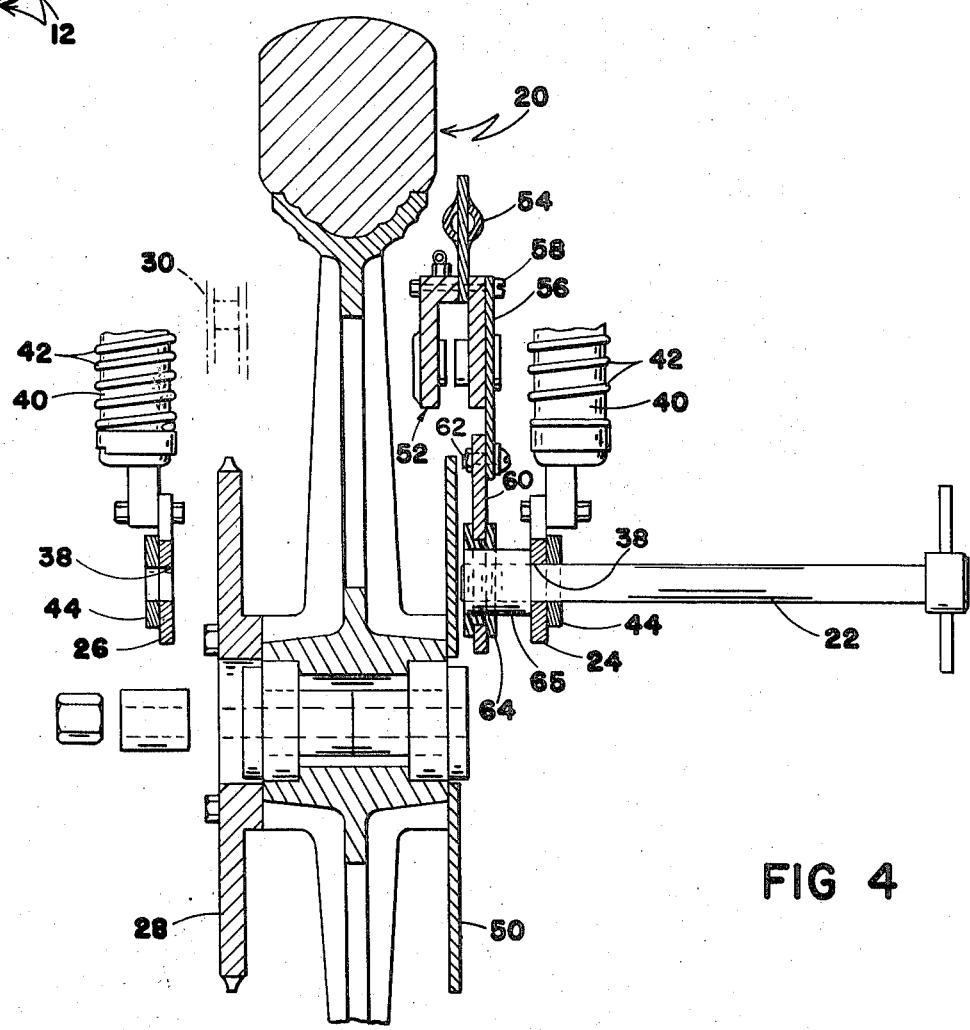
Figure 6:
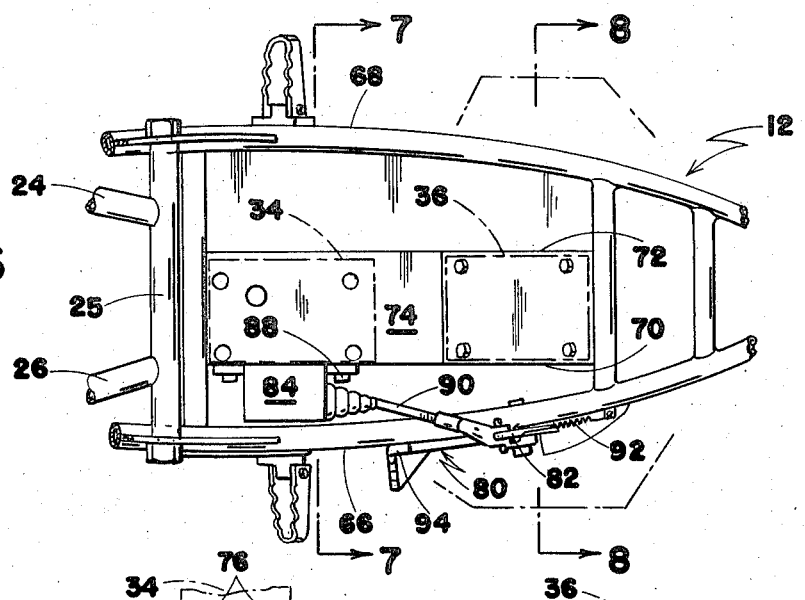
Figures 7, 8:
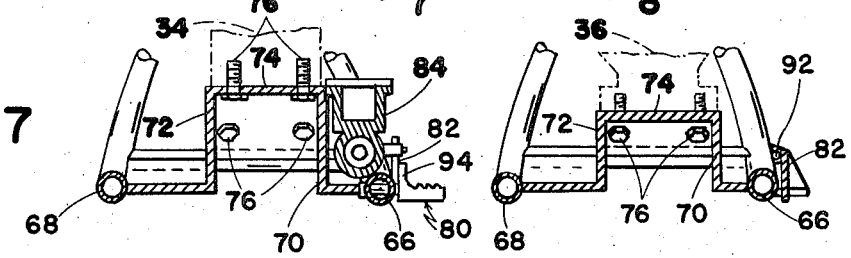
Figure 5:
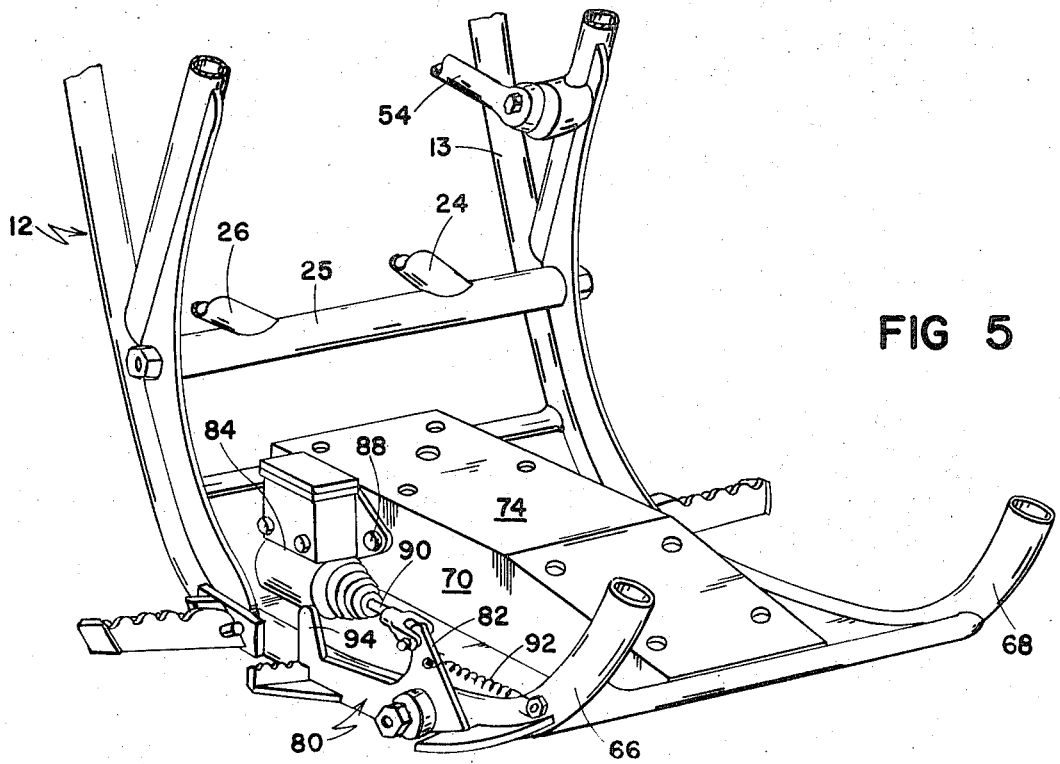

FIGS. 3 and 4 are, respectively, horizontal and vertical cross sections taken on lines 3—3 and 4—4 of FIG. 2, the latter showing the rear wheel partly removed;

FIG. 5 is a perspective view of the bottom portion of the frame and the brake pedal assembly of the motorcycle of FIG. 1;

FIG. 6 is a top view of the frame portion of FIG. 5, and;

FIGS. 7 and 8 are vertical cross sections taken on lines 7—7 and 8—8, respectively.

Referring to the drawings, the motorcycle of the invention, as seen in its entirety in FIG. 1, is conventional in many respects and has a tubular main frame assembly, generally designated 12, a front wheel 14 supported by a front fork 16 rotatably supported at the front of frame 12 and steerable by handlebars 18, and a rear wheel 20. Rear wheel 20, as best shown in FIGS. 2 through 4, has an axle 22 which is mounted on and extends between the ends of a pair of trailing suspension arms 24, 26 pivotally mounted by cross tube 25 on frame 12 for simultaneous pivotal movement about a horizontal axis. A pair of conventional resiliently compressible suspension elements 40 with springs 42 are pivotally mounted on the free ends of suspension arms 24, 26 and extend upwardly therefrom to a pivotal mounting on frame 12. Rear wheel 20 is provided with a chain sprocket 28 which is driven by sprocket 32 on power transmission unit 34 through chain 30 trained about said sprockets. Said power transmission unit is in turn driven by engine unit 36, both said units being mounted in fixed position on the bottom portion of frame 12, as hereinafter more fully explained. The engine and transmission units are preferably of the type which provide a variable ratio drive sensitive to rear wheel traction. In order to permit adjustment of chain tension, suspension arms 24, 26 at their trailing ends have horizontally extended slots 38, the ends of axle 22 being positioned in said slots by axle mounting brackets 44 having bores supporting said axle, said brackets being adjustably positioned by bolts 46 mounted in bolt brackets 48 on suspension arms 24, 26.

Accordingly to the present invention, as best seen in FIGS. 2 through 4, rear wheel 20 is provided with a novel disk brake system, preferably hydraulic, including a brake disk 50 mounted on said wheel and a preferably hydraulic brake caliper element assembly 52 cooperating with said brake disk. In order to prevent braking force reaction on the rear wheel suspension elements 40, there is provided a caliper element assembly compression arm 54 pivotally mounted on frame 12 above and spaced from trailing suspension arm 24 and generally parallel thereto, arm 54 passing behind and inside of frame element rear side portion 13 and a rear suspension element 40, between them and rear wheel 20 for protection of arm 54. Caliper element 52 is mounted by bolts 58 on the free end of caliper element arm 54 and extends downwardly therefrom for cooperation with the upper portion of brake disk 50. Bolts 58 also support a downwardly extending mounting plate 56 having a bore at its lower end, said plate forming an element of such assembly. A positioning radius link 60, having a bore in its upper end, is pivotally connected to caliper element plate 56 adjacent the lower end thereof, by means of pivot bolt 62 extending through said bores. Link 60 extends downwardly therefrom and is pivotally connected to axle 22 concentrically thereof by bushing 64 and sleeve 65 for positioning said caliper element assembly during rear wheel adjustment.

Referring now more particularly to FIGS. 5 through 8, the bottom portion of frame 12 includes a pair of transversely spaced frame members 66, 68 having a sheet metal plate extending therebetween, both to provide a skid plate and a readily releaseable and protected mounting for engine and transmission units 34, 36. The central portion of said plate is formed to provide a pair of longitudinal upwardly extending spaced vertical walls 70, 72 with a horizontal transverse wall 74 extending between the upper ends thereof providing an upwardly extending open bottomed recess between said vertical walls. Engine and transmission units are mounted on the upper surface of horizontal transverse wall 74 by a plurality of bolts 76 extending through suitable holes in said wall, said bolts having their heads positioned beneath the lower surface of transverse wall 74 and so being recessed above the lower ends of upwardly extending walls 70, 72 for protecting the bolt heads while providing ready access thereto.

As also best seen in FIGS. 5 through 8, for operating the hydraulic brake caliper described above, the invention provides a novel brake pedal assembly mounted on the lower portion of frame 12. More specifically, there is provided a rearwardly extending brake pedal arm 80 pivotally mounted on lower side frame member 66 and having an upwardly extending rigid operating arm 82. A rear hydraulic brake piston and cylinder 84, connected to rear hydraulic brake caliper element assembly by a suitable hydraulic link 86, is mounted on longitudinal upwardly extending wall 70 by a plurality of bolts 88. A generally horizontal connecting link 90 extends rearwardly from operating arm 82 to the piston of said piston and cylinder 84, and a spring 92 is provided to pull said link forward to inoperative position. On brake pedal arm 80, there is also provided a vertically extending guard plate 94 mounted adjacent the free end of said brake pedal arm extending upwardly closely adjacent to and beside the lower side frame member 66 to prevent side bending of arm 80.

Operation of the motorcycle of the invention is conventional insofar as the driver is concerned. However, the novel floating rear brake system, as can best be seen in FIG. 4, is unique in its provision of a disk brake which is readily disassembled and reassembled without the necessity for brake adjustment, nor is brake adjustment needed when the rear wheel is adjusted for chain tightness. In addition, the functioning brake elements are protected against damage since they are positioned above the trailing suspension arm 24 and behind frame and suspension elements. The novel trailing brake pedal 80 is also much less susceptible to damage, and provides a short, direct connection to the hydraulic brake piston and cylinder which greatly reduces the need for adjustment. When removal of power units is necessary, the mounting bolts thereof are readily assembled, yet they are protected against damage during operation.

What is claimed is:

1. In a motorcycle including
    a frame
    a rear wheel having an axle
    a pair of trailing suspension arms pivotally mounted on said frame for simultaneous pivotal movement about a transverse axis, and
    a pair of resiliently compressible suspension elements extending from the free ends of said suspension arms upward to said frame
    that improvement which consists of:
    a rear wheel brake assembly comprising
    a brake disk mounted on said wheel
    a brake caliper element assembly
    a caliper element assembly arm pivotally mounted on said frame above and spaced from one of said trailing suspension arms and generally parallel thereto,
    said brake caliper element assembly being mounted on the free end of said caliper element arm extending downwardly therefrom for cooperation with the upper portion of said brake disk and
    a positioning radius link pivotally connected to said brake caliper element assembly adjacent the lower end thereof, extending downwardly therefrom and pivotally connected adjacent said axle for positioning said caliper element.

2. In a motorcycle as claimed in claim 1 wherein said caliper element assembly arms is positioned inside of one of said suspension elements and a portion of said frame between them and said rear wheel for protection of said caliper element assembly arm.

3. In a motorcycle as claimed in claim 2 wherein said positioning radius link is connected to said axle concentrically thereto.

4. In a motorcycle as claimed in claim 3 wherein said brake caliper element is hydraulically operated and further including
a hydraulic brake piston and cylinder connected to said brake caliper element and
a brake lever pivotally mounted on said motorcycle for operating said piston.

5. In a motorcycle comprising
a frame having a bottom portion
a rear wheel having an axle
a pair of trailing suspension arms pivotally mounted on said frame for simultaneous pivotal movement about a horizontal axis,
a pair of resiliently compressible suspension elements extending from the free ends of said suspension arms upwardly to said frame
that improvement which consists of:
a rear wheel brake assembly comprising
a brake disk mounted on said wheel
a hydraulic brake caliper element assembly
a caliper element arm pivotally mounted on said frame above and spaced from one of said trailing suspension arms and generally parallel thereto,
said brake caliper element assembly being mounted on the free end of said caliper element arm extending downwardly therefrom for cooperation with the upper portion of said brake disk
a positioning radius link pivotally connected to said caliper element assembly adjacent the lower end thereof, extending downwardly therefrom and pivotally connected to said axle concentrically thereto for positioning said caliper element assembly, and a brake pedal assembly mounted on the lower portion of said frame including
a rearwardly extending brake pedal arm pivotally mounted on the lower portion of said frame and having an upwardly extending rigid operating arm,
a hydraulic brake piston and cylinder mounted on the lower portion of said frame and connected to said hydraulic brake caliper element and
a generally horizontal connecting link extending rearwardly from said operating arm to said piston.

6. In a motorcycle including
a frame having a bottom portion and
a rear wheel having a hydraulic brake
that improvement which consists of:
a brake pedal assembly mounted on the lower portion of said frame including
a rearwardly extending brake pedal arm pivotally mounted on the lower portion of said frame and having an upwardly extending rigid operating arm,
a rear hydraulic brake piston and cylinder mounted on the lower portion of said frame and connected to said hydraulic brake caliper element and
a generally horizontal connecting link extending rearwardly from said operating arm to said piston.

7. A motorcycle comprising
a frame having a bottom portion
a rear wheel having an axle and a chain sprocket
a power unit having a chain sprocket and mounted in fixed position on said frame bottom portion
a chain trained around said sprockets for driving said rear wheel a pair of trailing suspension arms pivotally mounted on said frame for simultaneous pivotal movement about a horizontal axis,
said suspension arms at their trailing ends having adjustable axle mounting means for adjusting said chain
a pair of resiliently compressible suspension elements extending from the free ends of said suspension arms upwardly to said frame
a brake disk mounted on said wheel
a hydraulic brake caliper element assembly cooperating with said brake disk
a caliper element assembly arm pivotally mounted on said frame above and spaced from one of said trailing suspension arms and generally parallel thereto, behind one of said suspension elements and a portion of said frame
said caliper element assembly being mounted on the free end of said caliper element arm extending downwardly therefrom for cooperation with the upper portion of said brake disk
a positioning radius link pivotally connected to said caliper element assembly adjacent the lower end thereof, extending downwardly therefrom and pivotally connected to said axle concentrically thereof for positioning said caliper element assembly during rear wheel adjustment.

8. A motorcycle as claimed in claim 7 wherein
the bottom portion of said frame includes a pair of transversely spaced frame members having a sheet metal plate extending therebetween
the central portion of said plate being formed to provide a pair of longitudinal upwardly extending spaced vertical walls with a horizontal transverse wall extending between the upper ends thereof providing an upwardly extending open bottomed recess between said vertical walls and
a plurality of bolts mounting said power unit on the upper surface of said horizontal transverse wall,
said bolts having heads positioned beneath the lower surface of said transverse wall recessed above the lower ends of said upwardly extending walls for protecting said bolt heads while providing access thereto.

9. A motorcycle as claimed in claim 8 further including
a brake pedal assembly mounted on the bottom portion of said frame including
a rearwardly extending brake pedal arm pivotally mounted on the lower portion of said frame and having an upwardly extending rigid operating arm,
a rear hydraulic brake piston and cylinder connected to said hydraulic brake caliper element
a plurality of bolts mounting said brake cylinder on one of said longitudinal upwardly extending walls and
a generally horizontal connecting link extending rearwardly from said operating arm to said piston.

10. A motorcycle as claimed in claim 9 further including
a vertically extending guard plate mounted adjacent the free end of said brake pedal arm extending upwardly closely adjacent to and beside the lower portion of said frame.

* * * * *